United States Patent
Chang et al.

(10) Patent No.: US 8,045,067 B2
(45) Date of Patent: Oct. 25, 2011

(54) METHOD AND APPARATUS OF LOCATING CHANNELS IN A FREQUENCY BAND

(75) Inventors: Chih-Cheng Chang, Keelung (TW); Ming-Che Tan, Taipei (TW)

(73) Assignee: AU Optronics Corp., Hsinchu (TW)

( * ) Notice: Subject to any disclaimer, the term of this patent is extended or adjusted under 35 U.S.C. 154(b) by 1023 days.

(21) Appl. No.: 11/935,307

(22) Filed: Nov. 5, 2007

(65) Prior Publication Data

US 2008/0117338 A1      May 22, 2008

(30) Foreign Application Priority Data

Nov. 17, 2006  (TW) .............................. 95142550 A

(51) Int. Cl.
*H04N 5/50* (2006.01)
(52) U.S. Cl. ...................................... 348/732; 348/731
(58) Field of Classification Search .................. 348/731, 348/732, 735; 455/150.1
See application file for complete search history.

(56) References Cited

U.S. PATENT DOCUMENTS

| | | | |
|---|---|---|---|
| 6,798,463 B1 * | 9/2004 | Sakakibara | 348/732 |
| 7,941,112 B2 * | 5/2011 | Chang et al. | 455/161.1 |
| 2005/0114889 A1 * | 5/2005 | Liu et al. | 725/53 |

FOREIGN PATENT DOCUMENTS

| | | |
|---|---|---|
| CN | 1735164 A | 2/2006 |
| DE | 4439658 | 5/1995 |
| EP | 1156611 A2 | 11/2001 |
| TW | I227070 | 1/2005 |
| WO | WO 97/32421 | 9/1997 |
| WO | WO 2004/093327 A2 | 10/2004 |

* cited by examiner

*Primary Examiner* — Ngoc Vu

(57) ABSTRACT

A method for searching a frequency band to locate a channel. The method includes the steps of setting an initial frequency and a first frequency step; determining a frequency point based on the initial frequency and the first frequency step; determining whether the frequency point satisfies a first condition, which is continuously detecting a horizontal signal a predetermined number of times. When the first condition is satisfied, the frequency point is recorded as an entrance point. A second frequency step based on the entrance point determines a second frequency point, wherein the second frequency step is less than the first frequency step. It is then determined if a channel exists at the second frequency point. The entrance point is recorded as the updated initial frequency for the next search. The described steps are repeated for the entire frequency band.

18 Claims, 3 Drawing Sheets

METHOD AND APPARATUS OF LOCATING CHANNELS IN A FREQUENCY BAND

BACKGROUND OF THE INVENTION

Field of the Invention

The invention relates to methods and systems for locating channels, and, more particularly, to methods and systems for efficiently locating television channels.

Typically, televisions are equipped with a channel searching device or method for locating television signals in a given frequency band. The channel searching function is essential if the television has never been used. Typically, all viewable television channels are recorded at first use, and thus when the television is next used, only viewable channels are presented for selection. Locating all the channels in a given frequency band is, however, a time-consuming task. Thus, a solution for more efficiently and rapidly locating all viewable channels is desirable.

BRIEF SUMMARY OF THE INVENTION

Accordingly, a method for efficiently locating channels is provided. In one embodiment, the method comprises setting an initial frequency and a first frequency step. A frequency point is set based on the initial frequency and the first frequency step. If the frequency point satisfies a first condition, which is continuously detecting a horizontal signal for a predetermined number of times, the frequency point is recorded as an entrance point. A second frequency step determines a second frequency point based on the entrance point, wherein the second frequency step is less than the first frequency step. It is then determined if a channel exists at the second frequency point. The initial frequency is then updated as the frequency of the entrance point. The above steps are repeated until the entire frequency band is searched.

In another aspect of the invention, a channel searching apparatus is provided. The apparatus comprises a tuner, a video processor, an audio processor, an auto frequency control, and a recorder. The tuner tunes to a frequency point which is a first frequency step away from an initial frequency, or to a second frequency point which is a second frequency step away from an entrance point. A video processor provides a horizontal signal and a vertical signal enabling a central processor to accordingly determine if any channel exists. The central processor executes the steps described in the followings to determine if any channel exists.

First, the tuner tunes to the frequency point, which is the first frequency step away from the initial frequency, to determine whether the frequency point satisfies a first condition. The first condition is that a horizontal signal is continuously detected a predetermined number of times. Next, after the first condition is satisfied, the frequency point is recorded as an entrance point. When the first condition is not satisfied, the initial frequency is updated to be the frequency point, and the loop goes to the first step again. The tuner then tunes to the second frequency point which is a second frequency step away from the entrance point. It is then detected if a television channel exists at the second frequency point, wherein the second frequency step is less than the first frequency step. Finally, the loop, i.e. the three previously described steps, is repeated through the frequency band.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1A:
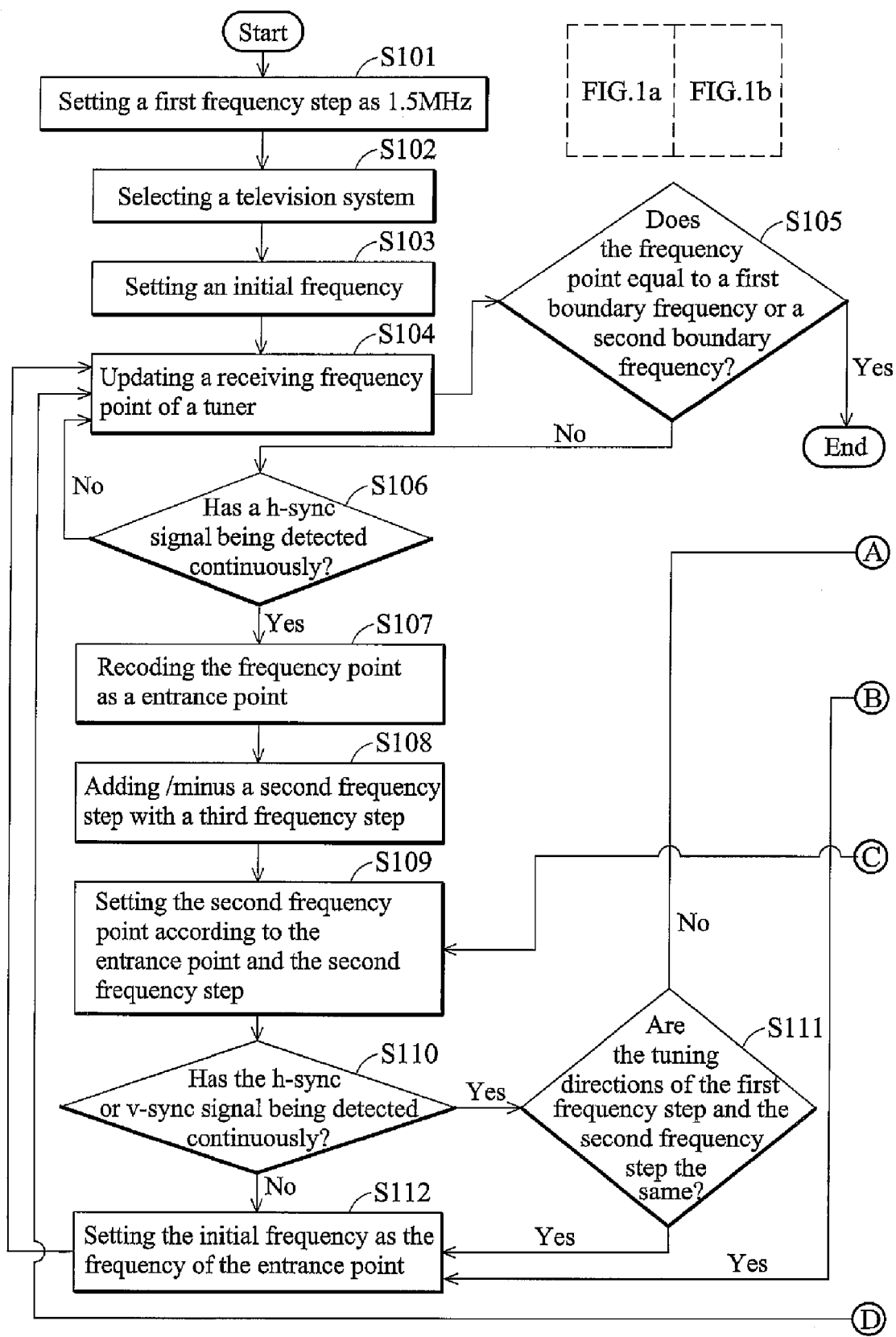
FIGS. 1a and 1b show a flowchart of locating a channel in a frequency band according to an embodiment of the invention.
Figure 2:
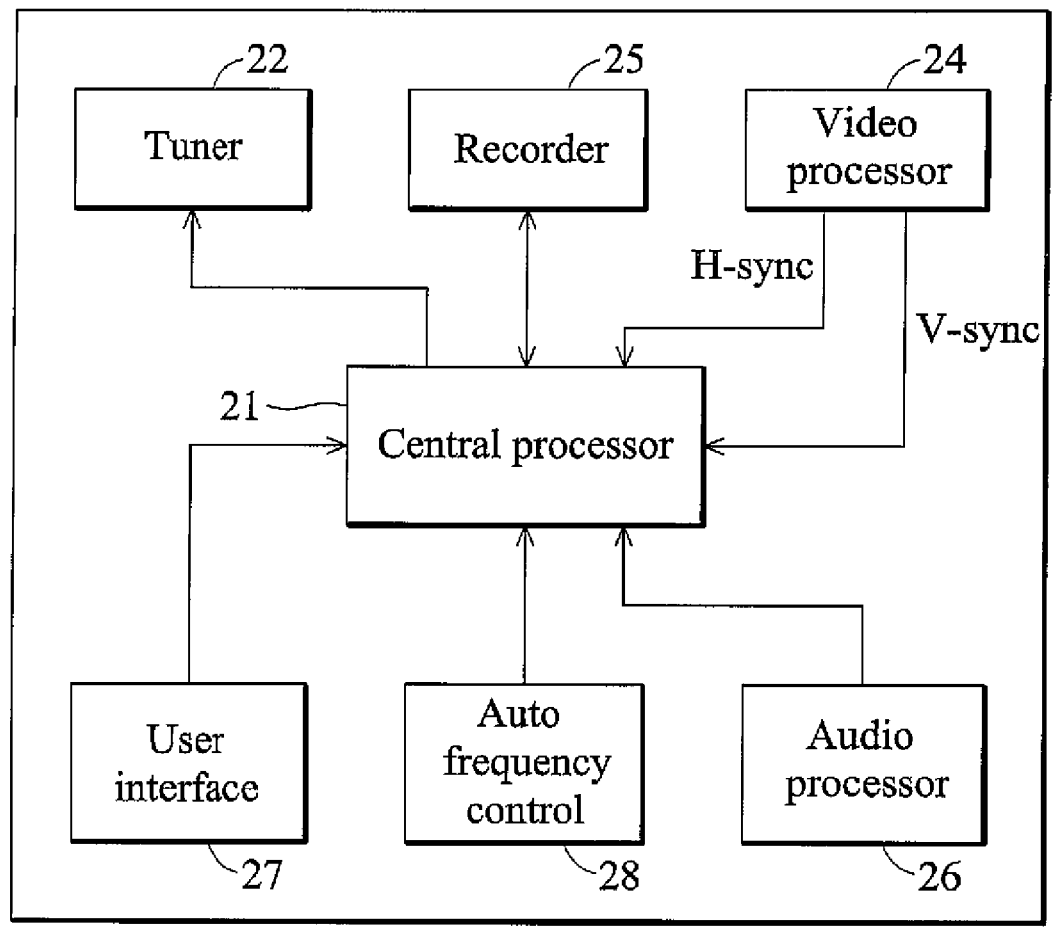
FIG. 2 shows a block diagram of a system 20 for locating a channel in a frequency band according to an embodiment of the invention.

FIG. 2 shows a block diagram of a system 20 for locating a channel in a frequency band according to an embodiment of the invention. A central processor 21 searches for a frequency containing a television channel in the frequency band in accordance with a horizontal synchronization signal (h-sync), a vertical synchronization signal (v-sync), an audio signal, and a frequency control signal. The audio signal is provided by an audio processor 26. The frequency control signal is provided by an auto frequency control 28. The central processor 21 determines if a higher frequency band or a lower frequency band is searched, and further determines the sizes of search windows based on the frequency control signal. A recorder 25, connected to the central processor 21 records the number of times step S109 in FIG. 1a is executed. The recorder 25 also records the frequency carrying the television signal. A user interface 27 is connected to the central processor 21. A user can select a desired television system through user interface 27.

The h-sync and v-sync are provided by a video processor 24. When the central processor 21 successfully receives the h-sync, the upper and lower edges of television frame align with a screen. In other words, if the h-sync is not received successfully, the frame is divided into two parts, the lower part of the frame appears in the upper side of the screen, and the upper part of the frame appears in the lower side of the screen. V-sync also has similar characteristics. When the central processor 21 successfully receives the v-sync, the left and right edges of television frame align with the screen.

Figure 1B:
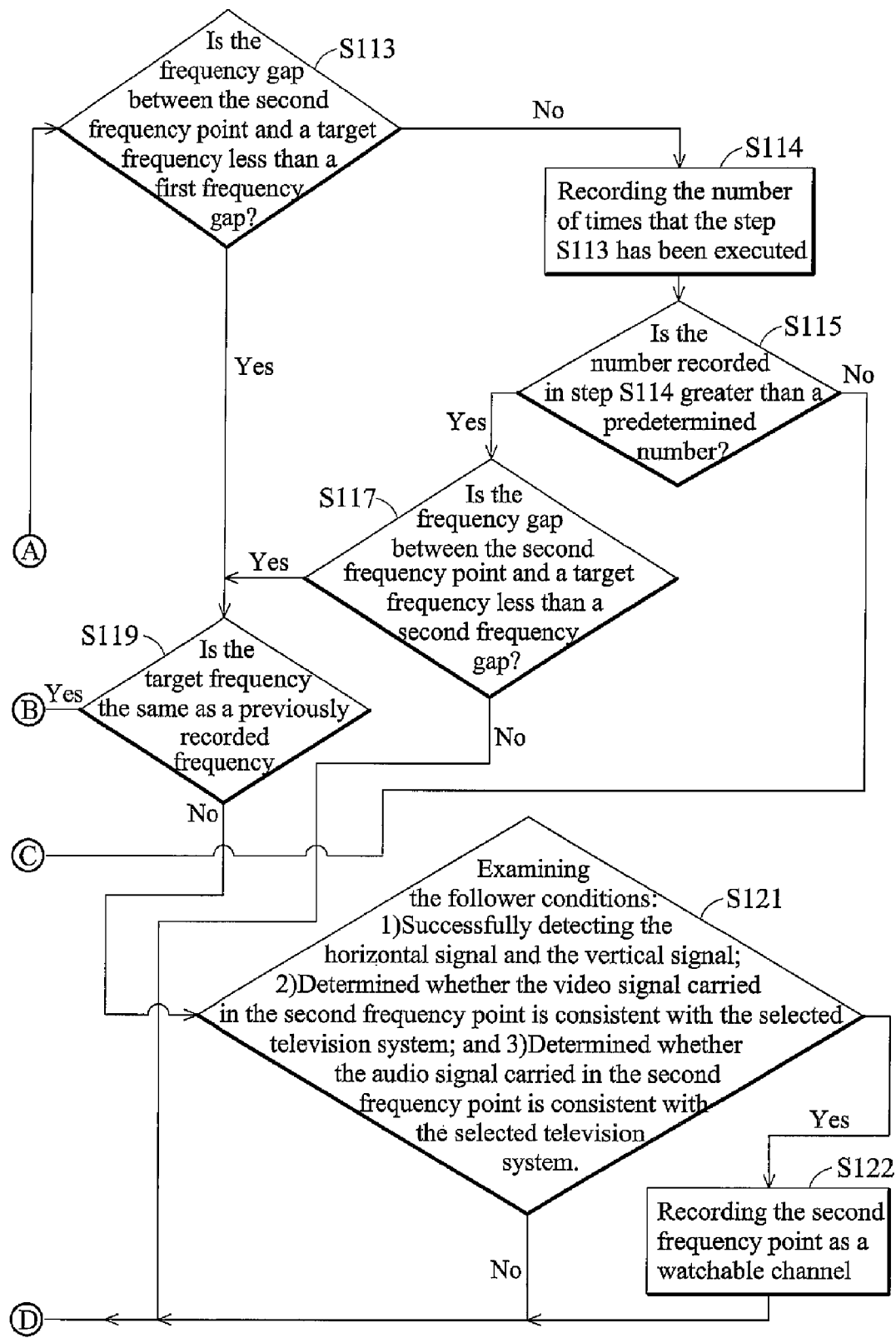

FIGS. 1a and 1b show a flowchart of locating a channel in a frequency band according to an embodiment of the invention. In one embodiment of the invention, the auto frequency control 28 can search the frequency band by a wider window (a first frequency step), and then search the frequency band by a narrower window (a second frequency step). That is, a tuner can roughly tune in a first frequency step, then fine tune in the second frequency step.

In step S101, the first frequency step is set 1.5 MHz. In step S102, a television system is selected. The television system can be Phase Alternating Line (PAL) or Sequential Couleur Avec Memoire (SECAM). In step S103, an initial frequency is set. In this embodiment, suppose the television frequency band is from a first boundary 41.25 MHz to a second boundary 866.25 MHz. Thus, in this embodiment, the initial frequency can be selected as 41.25 MHz. In step S104, the tuner tunes to a frequency point, which is the initial frequency plus the first frequency step. In step S105, the frequency point is determined. If the frequency point is less than the first boundary 41.25 MHz or exceeds the second frequency boundary 866.25 MHz, the flow ends with step S105; otherwise the horizontal signal is detected (S106). If the horizontal signal is continuously detected a predetermined number of times, the frequency point is recorded as an entrance point (S107). If the horizontal signal is not continuously detected a predetermined number of times, the process returns to step S104 to update the frequency point according to the first frequency step. In one embodiment of the invention, the predetermined number of times is two. The reason for continuously detecting the horizontal signal twice in step S106 is that only detecting the horizontal signal once may likely result in a noise signal being detected as a television signal. In step S109, a second frequency point is set according to the entrance point and a second frequency step. The second frequency point may be the entrance point plus the second frequency step or minus the second frequency step, depending on a frequency control signal. For example, if the initial frequency is 41.25 MHz, and a user wants to search the upper frequency band (a frequency control signal is "up"), then the second frequency point is the entrance point plus the second frequency step. If a user wants to search the lower frequency band and sends a "low" frequency control signal, the second frequency point is the entrance point minus the second frequency step. The second frequency step size may be up to the tuning step of the tuner. In the embodiment, the second frequency step may be 187.5 kHz, 128.5 kHz, 62.5 kHz, 37.5 kHz, or 12.5 kHz.

In an embodiment of the invention, the second frequency point may be the entrance point plus or minus a third frequency step in advance, and then plus or minus the second frequency step (S108), wherein the third frequency step is less than the first frequency step but exceeds the second frequency step. The size of the third frequency step may be decided by experimental results. Please note that while step S108 is optional, it may save more time to locate channels by utilizing the third frequency step. In step S110, the vertical signal or the horizontal signal is continuously detected at the second frequency point by the predetermined number of times. If the vertical signal or the horizontal signal is not continuously detected, it means that in step S106 the detected horizontal signal was actually a noise signal. The initial frequency is then updated to be the frequency of the current entrance point (S112), and returns to step S104. On the other hand, if the vertical signal or the horizontal signal can be continuously detected the predetermined numbers of times, the directions of fine tune and rough tune are checked (S111).

If a user wants to search upward, the tuner tunes a frequency point which is the initial frequency plus the first frequency step. When the auto frequency control 28 determines that there may be a channel within the first frequency step, the second frequency step is used to fine tune the frequency. When the auto frequency control decides to search channel at the frequency point minus the second frequency step, it may represent that the auto frequency control has misjudged. Thus, in step S111 it is checked whether the directions of the first and the second frequency steps are different. If true, the flow proceeds to step S112. If the directions of fine tune and rough tune are the same, the flow proceeds to step S113.

In step S113, a first gap between the second frequency point and a target frequency is measured according to the frequency control signal. The target frequency is an estimated frequency carrying a television channel. If the first gap is less than a first frequency gap, the process flow proceeds to step S119. If the first gap exceeds the first frequency gap, the number of times the first frequency gap is so exceeded is recorded (S114). In this embodiment, the first frequency is 37.5 MHz. In step S115, the number recorded in step S114 is compared with a predetermined number. In this embodiment, the predetermined number is 6. Step S114 may prevent locating ghost channels. For example, if the first gap between the second frequency point and a target frequency is 75 kHz, it takes six adjustments of the tuner by the second frequency step 12.5 kHz to reach the target frequency. If the tuner tunes to the estimated target frequency but the auto frequency control continues to fine tune the tuner, the estimated target frequency may represent a ghost channel or the signal at the target frequency may be too weak to be received. If the first gap is unable to converge after repeated attempts, the estimated target frequency may be a ghost channel. If the recorded number in step S114 does not exceed the predetermined number, the flow returns to step S109. If the recorded number in step S114 exceeds the predetermined number, the first gap is compared with a second frequency gap in step S117. If the number of fine tuning attempts exceeds the predetermined number, it is possible that the signal in the target frequency is too weak. It may help to locate the weak channel by checking whether the gap between the target frequency and the second frequency point, i.e. the first gap, is less than the second frequency gap. In this embodiment of the invention, suppose the second frequency gap is 62.5 KHz. The second frequency gap must exceed the first frequency gap. If in step S117, the gap between the target frequency and the second frequency point, i.e. the first gap, is less than the second frequency gap, the second frequency point is compared with a previously recorded frequency in step S119. When the second frequency point is the same as the previously recorded frequency, the second frequency point is the same the as previously located channel. Thus, the flow returns to step S112. If, in step S117, the measured gap exceeds the second frequency gap the estimated frequency is a ghost channel instead of a channel with weak signals. The flow returns to step S104, and the initial frequency is updated as the second frequency point plus or minus the second frequency step. The frequency control signal is used to determine whether the updated initial frequency is the second frequency point plus the second frequency step or the second frequency point minus the second frequency step.

If, in step S119, the second frequency point is not the same as the previously recorded frequency, the second frequency point is examined by a condition (S121). The condition comprises: successfully detecting the horizontal signal and the vertical signal; determining whether the video signal carried in the second frequency point is consistent with the television system selected in step S102, and determining whether the audio signal carried in the second frequency point is consistent with the aforementioned selected television system. Occasionally, noise or ghost channels are recognized as a target channel. Thus in step S121, the horizontal signal and vertical signal is re-checked to avoid that undesired situation. If the condition is satisfied, the second frequency point is recorded, indicating that a television channel exists in the frequency. The flow then proceeds to step S104 for further searching. If the condition in step S121 is not satisfied, the flow directly proceeds to step S104.

In another embodiment of the invention, the initial frequency can be set to 866.25 in step S103. In step S104 of this embodiment, the updated initial frequency point is therefore the original initial frequency minus the first frequency step.

In Europe, multiple television systems are in use. The apparatus and methods of the invention are suitable for a variety of television systems. For example, a user can search for of BG, DK and I television channels in the PAL system and then search for L and L' television channels in the SECAM system. A user can alternatively search the SECAM system first then the PAL system.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for locating a channel in a frequency band, comprising:
   (a) setting an initial frequency and a first frequency step, determining a frequency point based on the initial frequency and the first frequency step, and checking whether the frequency point satisfies a first condition which is continuously detecting a horizontal signal a predetermined number of times;
   (b) when the first condition is satisfied, recording the frequency point as an entrance point, and when the first condition is not satisfied, updating the frequency of the frequency point according to the first frequency step, and going to step (a);
   (c) based on the entrance point, a second frequency step and a frequency control signal, determining a second frequency point, wherein the second frequency step is less than the first frequency step, and checking whether the second frequency point satisfies a second condition which is continuously detecting a vertical signal or the horizontal signal the predetermined number of times;
   (d) when the second condition is satisfied, determining whether a gap between the second frequency point and a target frequency is less than a first frequency gap;
   (e) when the second condition is not satisfied, updating the initial frequency to be the frequency of the entrance point;
   (f) if the gap determined in step (d) between the second frequency point and target frequency is less than the first frequency gap, recording that a television channel exists at the second frequency point; and
   (g) repeating steps (a)-(f) through the frequency band.

2. The method as claimed in claim 1, whether in step (f) further comprises:
   (f1) recording how many times the gap between the second frequency point and the target frequency exceeds the first frequency gap, and determining whether the recorded number exceeds a predetermined number;
   (f2) when the recorded number exceeds the predetermined number, determining whether the gap between the second frequency point and the target frequency exceeds a second frequency gap, wherein the second frequency gap exceeds the first frequency gap; and
   (f3) when the recorded number is less than the predetermined number, updating the entrance point to be the second frequency point, and going to step (c).

3. The method as claimed in claim 2, wherein the step (f2) further comprises:
   (h) when the gap between the second frequency point and the target frequency is less than the second frequency gap, determining if the second frequency point is the same as a previously recorded frequency; if true, updating the initial frequency to be the second frequency point, and going to step (g).

4. The method as claimed in claim 3, wherein the step (h) further comprises updating the initial frequency according to the initial frequency and the first frequency step and going to step (g) when the gap between the second frequency point and the target frequency exceeds the second frequency gap.

5. The method as claimed in claim 3, wherein the step (h) further comprises checking whether the second frequency point satisfies a third condition when the second frequency point is different from the previously recorded frequency, and recording that the television channel exists at the second frequency point, wherein the third condition comprises:
   (h1) successfully detecting the horizontal signal and the vertical signal;
   (h2) a video signal carried in the second frequency point consistent with a predetermined television signal specification; and
   (h3) a audio signal carried in the second frequency point consistent with the predetermined television signal specification.

6. The method as claimed in claim 5 further comprising: updating the initial frequency according to the initial frequency and the first frequency step, and going to step (g) when the third condition is not satisfied.

7. The method as claimed in claim 1, wherein determining the second frequency point based on the entrance point, the second frequency step and the frequency control signal in step (c) is determining whether to set the frequency of the second frequency point as (1) the frequency of the entrance point plus the second frequency step, or (2) the frequency of the entrance point minus the second frequency step, according to the frequency control signal.

8. The method as claimed in claim 7, wherein the frequency point in step (a) is a frequency equal to the initial frequency plus the first frequency step, and further comprises updating the initial frequency to be the frequency of the entrance point and going to step (a) if the second frequency point determined in step (c) is equal to the entrance point minus the second frequency step.

9. The method as claimed in claim 7, wherein the frequency point in step (a) is a frequency equal to the initial frequency minus the first frequency step, and further comprises updating the initial frequency to be the frequency of the entrance point and going to step (a) if the second frequency point determined in step (c) is equal to the entrance point plus the second frequency step.

10. The method as claimed in claim 1, before step (c), further comprising detecting if the television channel exists at a frequency which is a third frequency step away from the entrance point, wherein the third frequency step is less than the first frequency step but exceeds the second frequency step.

11. A channel searching apparatus for locating a channel in a frequency band, comprising:
    a tuner for tuning to a frequency point which is a first frequency step away an initial frequency or tuning to a second frequency point which is a second frequency step away from an entrance point;
    a video processor for providing a horizontal signal and a vertical signal; and
    a central processor for executing steps (a)-(d):
      (a) when the tuner tunes to the frequency point which is the first frequency step away from the initial frequency, checking whether the frequency point satisfies a first condition, which is continuously detecting a horizontal signal by a predetermined number of times;
      (b) when the first condition is satisfied, recording the frequency point as the entrance point, and when the first condition is not satisfied, updating the initial frequency according to the frequency point, and going to step (a);
      (c) when the tuner tunes to the second frequency point which is a second frequency step away from the entrance point, detecting if a television channel exists at the second frequency point, wherein the second frequency step is less than the first frequency step; and
      (d) repeating steps (a)-(c) through the frequency band.

12. The apparatus as claimed in claim 11, further comprising an auto frequency control for providing a frequency control signal, wherein the step (c) further comprises detecting the second frequency point according to the frequency control signal, the entrance point, and the second frequency step, and determining whether a signal received at the second frequency point satisfies a second condition which is continuous detection of the vertical signal or the horizontal signal by the predetermined number of times; when the second condition is satisfied, the central processor determines whether a difference between the second frequency point and a target frequency is less than the first frequency gap, and when the second condition is not satisfied, the central processor updates the initial frequency to be the frequency of the entrance point.

13. The apparatus as claimed in claim 12, wherein the central processor determines whether to set the frequency of the second frequency point as (1) the frequency of the entrance point plus the second frequency step, or (2) the frequency of the entrance point minus the second frequency step according to the frequency control signal, when the frequency point in step (a) equals to the initial frequency minus the first frequency step and the central processor determines to set the frequency of the second frequency point as the frequency of the entrance point plus the second frequency step, the central processor updates the initial frequency to be the frequency of the entrance point and going to step (a); and when the frequency point in step (a) equals to the initial frequency plus the first frequency step and the central processor determines to set the frequency of the second frequency point as the frequency of the entrance point minus the second frequency step, the central processor updates the initial frequency to be the frequency of the entrance point and going to step (a).

14. The apparatus as claimed in claim 12, further comprising a recorder, when the second condition is satisfied and the central processor determines that the gap between the second frequency point and the target frequency exceeds the first frequency gap, the recorder records how many times the gap between the second frequency point and the target frequency exceeds the first frequency gap, and the recorder determines whether the recorded number exceeds a predetermined number, when the recorded number is less than the predetermined number, the recorder updates the second frequency point to be the entrance point and the central processor executes step (c).

15. The apparatus as claimed in claim 14, wherein before step (c), the central processor further detects if a television channel exists at a frequency which is a third frequency step away from the entrance point, and the third frequency step is less than the first frequency step but exceeds the second frequency step.

16. The apparatus as claimed in claim 14, when recorded number exceeds the predetermined number, the central processor determines whether a gap between the second frequency point and the target frequency exceeds a second frequency gap, wherein the second frequency gap exceeds the first frequency gap, when the gap between the second frequency point and the target frequency exceeds the second frequency gap, the central processor updates the initial frequency according to the initial frequency and the first frequency step.

17. The apparatus as claimed in claim 16, when the second condition is satisfied, and when the gap between the second frequency point and the target frequency is less than the first frequency gap or the second frequency step, the central processor determines if the second frequency point is the same as a previously recorded frequency; if so, the central processor updates the initial frequency to be the entrance point and goes to step (d).

18. The apparatus as claimed in claim 17, when the central processor determines the second frequency point is not the same as the previously recorded frequency, the central processor further checks if a third condition is satisfied; when the third condition is satisfied, the recorder records that the television channel exists at the second frequency point, wherein the third condition comprises:

the horizontal signal and the vertical signal being successfully detected;

the video signal carried in the second frequency point being consistent with a predetermined television signal specification; and the audio signal carried in the second frequency point being consistent with the predetermined television signal specification.

* * * * *